April 30, 1963    E. SVOBODA    3,087,275
FLOATS FOR FISHING
Filed Jan. 12, 1961 ously to floats for bottom fishing or angling in still or
United States Patent Office 3,087,275
Patented Apr. 30, 1963

3,087,275
FLOATS FOR FISHING
Ernst Svoboda, Vienna, Austria
Filed Jan. 12, 1961, Ser. No. 82,332
2 Claims. (Cl. 43—44.87)

My invention relates more particularly but not exclu slowly moving water. Known floats for this purpose commonly consist of cork or similar material of low density or they may take the form of hollow airtight bodies. Usually the front of or lower end is hemi-spherical while the rear part is conical. There is an axial hole by which such a float is threaded loosely on the line. After casting the float remains at the surface while the baited hook and weight sink to the bottom. In order for the float to indicate a "bite" a stop, e.g. in the form of a split lead shot is set above the float on the line so that when the fish pulls on the hook the line will not be drawn freely through the float. This stop also serves to control the length of line below the float in accordance with the depth of the water. Thus, for setting the shot or stop, a preliminary cast is necessary to gage the depth. The line is then hauled in again and after the stop has been set fishing can begin.

One mechanical adaptation has been suggested in the past to make this preliminary casting unnecessary. This device is a freely threaded float which clamps itself to the line a preset time interval after casting. However, the design of this float is rather complicated for general use. Damage to the line is likely to result and owing to the clamping action it is difficult to "strike" the fish when it bites, i.e. to tug the line so as to ensure proper penetration of the hook.

One object of my invention is to provide a float which is free of the disadvantages of known floats.

Another object of my invention is the provision of a float with which has means which are held in a present position by adhesive, the adhesive being of such composition that after the float has been placed in the water the adhesive weakens and releases the means so that the line is gripped.

A further object of the invention is the provision of a float in which the line is threaded freely between two float sections in the closed position, the latter being connected by a hinge and by adhesive. They are hollow and mate with each other in the closed position apart from an axial passage from the line.

Further advantages and features of my invention will now become apparent from the ensuing description showing two novel floats embodying the invention.

In the drawing forming part of this specification:

Figure 1:
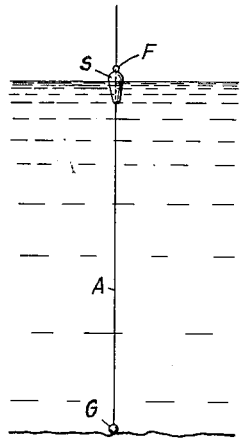
FIGURE 1 is a diagram of a novel float being used for bottom fishing.
Figure 2:
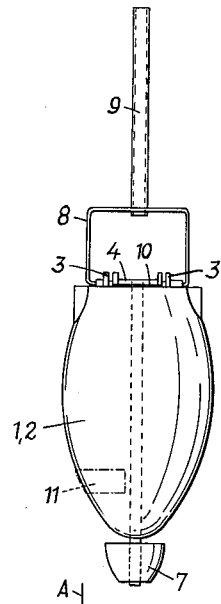
FIGURE 2 is a side view of one float with the float sections folded together.
Figure 3:
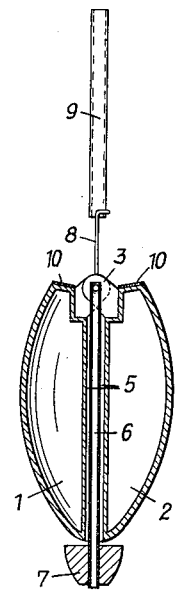
FIGURE 3 is a vertical section through the float as shown in FIGURE 2, taken at right angles to the plane of the paper.

Referring now to the drawings, and more particularly to FIGURE 1, it can be seen that G denotes the bottom weight, A the line, S the float and F the stop to limit relative movement of the float up the line. After a cast, the weight G lies at the bottom, while the float S cooperates with the stop F in holding the immersed portion of the line plumb over the bottom i.e. it is prevented from rising in relation to the rise by the stop F.

The float itself comprises two gas-tight, preferably airfilled, float sections 1 and 2 which can pivot around the spindle 4 by means of flanges 3. They mate accurately along a median vertical plane with the exception of leaving an axial cylindrical recess 5 in which lies a guide tube 6 for surrounding the line. The tube 6 is joined with the spindle at its upper end while its lower end outside the float sections 1 and 2 carries a small brass weight 7. The spindle 4 is hollow and into its ends there are inserted the ends of a stirrup 8 which is fixed rigidly to the upper guide tube 9. Owing to this arrangement the part of the line lying between the two tubes 9 and 6 is always held in the median plane of the float, i.e. the plane lying between the float sections.

Before the float is cast, its two sections are stuck together with, for example, adhesive paper 11.

In the water, the float then travels up the line guided by the tubes 6 and 9. After a short time interval, the adhesive of the paper 11 is loosened and the upthrust of the water causes the sections 1 and 2 to unfold into the position indicated in FIGURE 4 so that the gripping or braking faces 10 engage the line between them and the angler is ready for a fish to bite.

Figure 4:
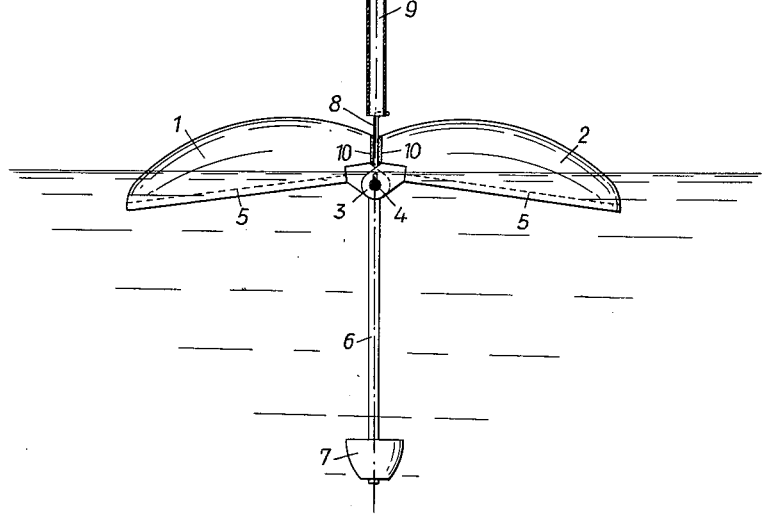
FIGURE 4 shows another float in the open position gripping the fishing line.

As indicated in the other novel float shown in FIGURE 4, the float sections 1 and 2 are arranged to be immersed to a considerable extent in the opened out position so as to increase the gripping action on the line.

I claim:

1. In an angling float which is arranged to slide freely on a fishing line, then to grip said line after a certain time after being cast into the water in response to the action of a time delay device, the improvement that said time delay device comprises adhesive, said float having pivotally connected buoyant sections capable of gripping said line on being pivoted in relation to each other, said adhesive being stuck to both said sections so as to hold them out of the position in which they grip said line, the adhesive being of such composition that its adhesive action is reduced in water to allow said sections to move in relation to each other and grip said line.

2. In an angling float which is arranged to slide freely on a fishing line, then to grip said line after a certain time after being cast into water in response to the action of a time delay device, the improvement that said time delay device comprises adhesive paper, said float having two pivotally connected buoyant sections capable of gripping said line on being pivoted in relation to each other, said adhesive paper being struck to both said sections so as to hold them out of the position in which they grip said line, the adhesive on said paper being of such composition that its adhesive action is reduced in water to allow said sections to move in relation to each other and grip said line.

References Cited in the file of this patent

UNITED STATES PATENTS

| | | |
|---|---|---|
| 786,597 | Picken | Apr. 4, 1905 |
| 2,153,339 | Reeves et al. | Apr. 4, 1939 |
| 2,308,238 | Baker | Jan. 12, 1943 |
| 2,537,235 | Parry | Jan. 9, 1951 |
| 2,707,347 | Sneed | May 3, 1955 |
| 2,842,886 | Williams | July 15, 1958 |
| 2,888,771 | Stephens et al. | June 2, 1959 |
| 2,914,883 | Kustusch | Dec. 1, 1959 |

OTHER REFERENCES

Field and Stream magazine, July 1957, pages 66 and 68.